United States Patent [19]

Patel et al.

[11] Patent Number: 5,192,563
[45] Date of Patent: Mar. 9, 1993

[54] STRONGLY MINT-FLAVORED CHEWING GUMS WITH REDUCED BITTERNESS AND HARSHNESS

[75] Inventors: Mansukh M. Patel, Downers Grove; Kevin B. Broderick, Berwyn; Marc A. Meyers, Naperville; Philip G. Schnell, Downers Grove; Joo H. Song, Northbrook; Robert J. Yatka, Orland Park; Steven E. Zibell, Tinley Park, all of Ill.

[73] Assignee: Wm. Wrigley, Jr. Company, Chicago, Ill.

[21] Appl. No.: 810,669

[22] Filed: Dec. 17, 1991

Related U.S. Application Data

[63] Continuation-in-part of Ser. No. 358,692, May 26, 1989, and a continuation-in-part of Ser. No. 134,948, Dec. 18, 1987, Pat. No. 4,863,745, and a continuation-in-part of Ser. No. 565,605, Aug. 9, 1990, which is a continuation-in-part of Ser. No. 383,291, Jul. 17, 1989, which is a continuation of Ser. No. 205,495, Jun. 6, 1988, abandoned, which is a continuation of Ser. No. 921,753, Oct. 22, 1986, abandoned, said Ser. No. 565,605, is a continuation-in-part of Ser. No. 311,125, Feb. 15, 1989, said Ser. No. 358,692, is a continuation-in-part of Ser. No. 205,495, Jun. 6, 1988, abandoned, which is a continuation of Ser. No. 921,753, Oct. 22, 1986, abandoned, said Ser. No. 134,948, is a continuation-in-part of Ser. No. 921,754, Oct. 22, 1986, abandoned.

[51] Int. Cl.$^5$ .............................................. A23G 3/30
[52] U.S. Cl. .......................................... 426/5; 426/96; 426/453; 426/651
[58] Field of Search ......................... 426/3-6, 426/96, 453, 454, 302, 651

[56] References Cited

U.S. PATENT DOCUMENTS

| | | | |
|---|---|---|---|
| 3,116,206 | 12/1963 | Brynko et al. | 426/96 |
| 3,576,663 | 4/1971 | Signorino et al. | 426/454 |
| 4,045,581 | 8/1977 | Mackay et al. | 426/3 |
| 4,137,300 | 1/1979 | Sheth et al. | 424/21 |
| 4,194,013 | 3/1980 | Rehacek et al. | 426/96 |
| 4,384,004 | 5/1983 | Cea et al. | 426/3 |
| 4,474,749 | 10/1984 | Kruppa | 424/48 |
| 4,863,745 | 9/1989 | Zibell | 426/5 |
| 4,919,941 | 4/1990 | Zibell | 426/5 |
| 4,931,295 | 6/1990 | Courtright et al. | 426/5 |
| 4,997,659 | 3/1991 | Yatka et al. | 426/3 |
| 5,077,053 | 12/1991 | Kuncewitch et al. | 424/441 |

FOREIGN PATENT DOCUMENTS

| | | |
|---|---|---|
| 0320522 | 6/1989 | European Pat. Off. |
| 0320523 | 6/1989 | European Pat. Off. |
| 0383428 | 8/1990 | European Pat. Off. |
| 0454287 | 10/1991 | European Pat. Off. |
| 3043914A1 | 6/1981 | Fed. Rep. of Germany |
| 2117506 | 6/1972 | France |
| 57-141273 | 9/1981 | Japan |
| 63-28575 | 6/1988 | Japan |
| WO89/03170 | 4/1989 | PCT Int'l Appl. |
| WO89/05589 | 6/1989 | PCT Int'l Appl. |
| WO89/11212 | 11/1989 | PCT Int'l Appl. |
| WO90/06061 | 6/1990 | PCT Int'l Appl. |
| WO90/06062 | 6/1990 | PCT Int'l Appl. |
| WO90/07859 | 7/1990 | PCT Int'l Appl. |
| WO90/07864 | 7/1990 | PCT Int'l Appl. |
| WO90/13994 | 11/1990 | PCT Int'l Appl. |
| WO90/14015 | 11/1990 | PCT Int'l Appl. |
| WO91/03147 | 3/1991 | PCT Int'l Appl. |

Primary Examiner—Jeanette Hunter
Attorney, Agent, or Firm—Willian Brinks Olds Hofer Gilson & Lione

[57] ABSTRACT

A method of making a zein-cellulose derivative gum ingredient is disclosed. Preferably, a solution of zein and water at a pH of between about 11.5 and about 12.1 is prepared, containing between about 10% and about 20% by weight zein, and the aqueous zein solution is combined with a cellulose derivative such as HPMC to form a zein-coated ingredient. The zein-cellulose derivative ingredient is then used to make chewing gum. The zein-cellulose derivative ingredient has been found to reduce late chew bitterness and harshness in high mint-flavor content gums.

20 Claims, 4 Drawing Sheets

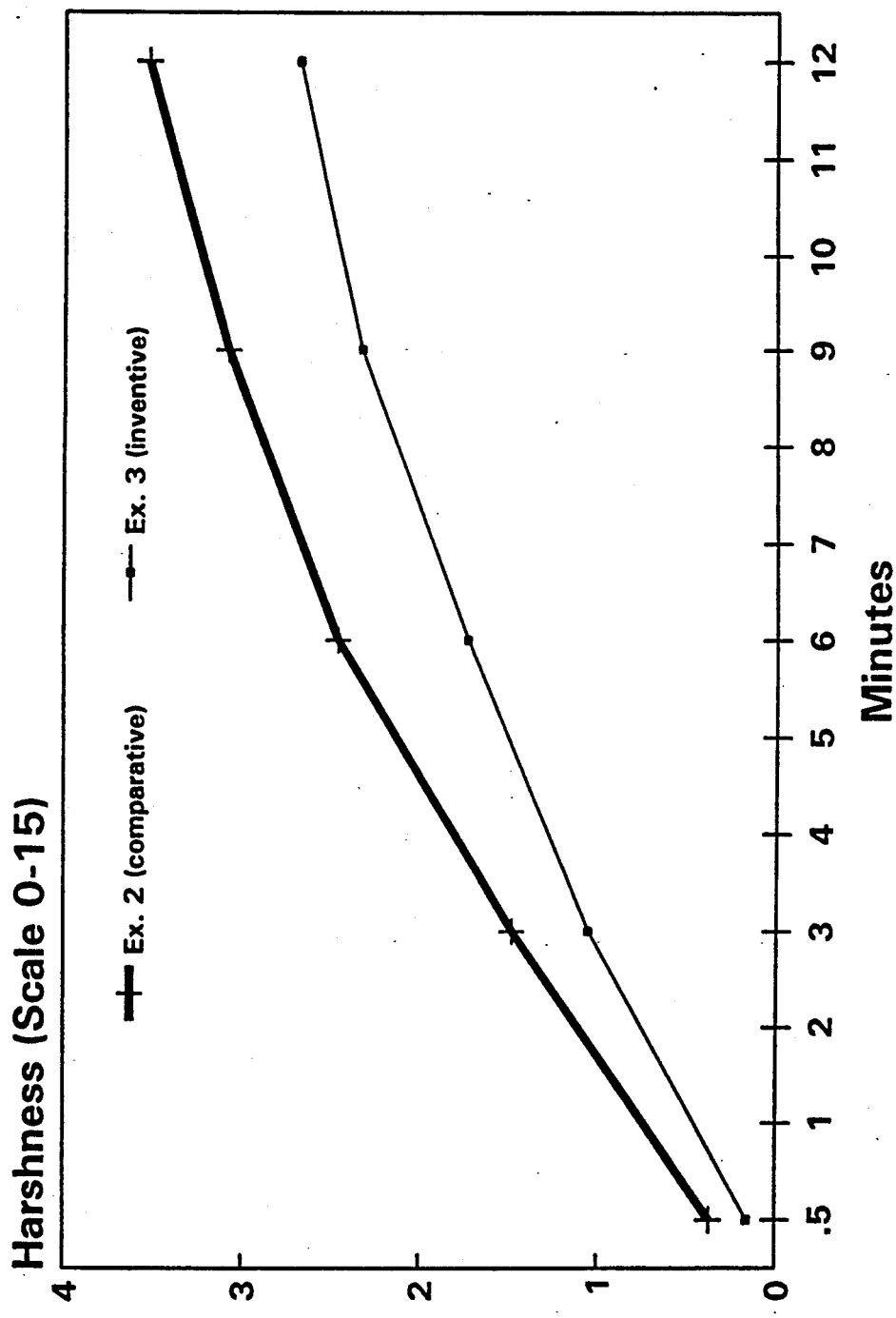

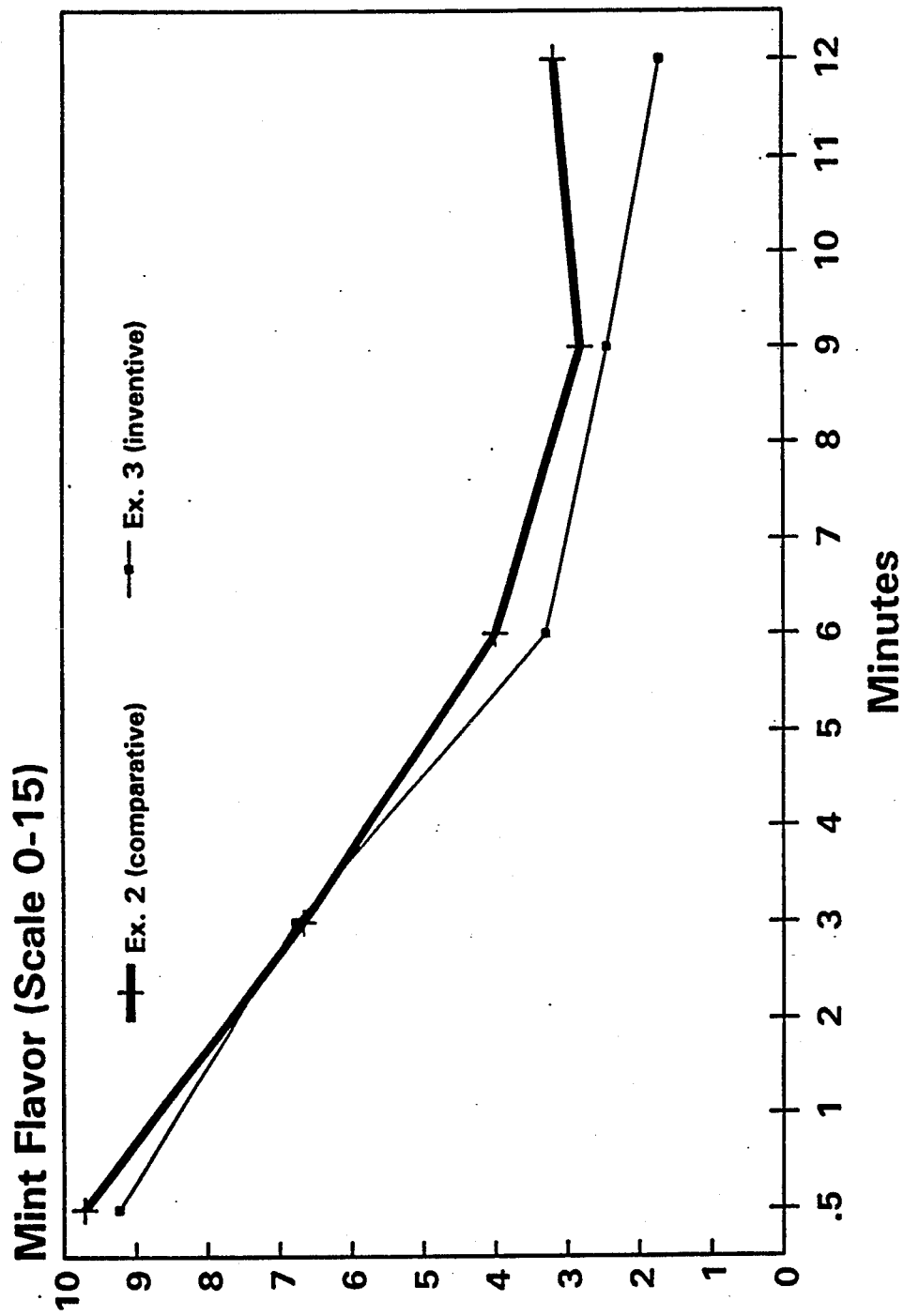

STRONGLY MINT-FLAVORED CHEWING GUMS WITH REDUCED BITTERNESS AND HARSHNESS

CROSS REFERENCE TO RELATED APPLICATIONS

The present application is a continuation-in-part of the following pending PCT applications designating the U.S.: Ser. No. PCT/US90/02255 filed Apr. 25, 1990; Ser. No. PCT/US90/04005 filed Jul. 17, 1990, and Ser. No. PCT/US90/06038 filed Oct. 22, 1990.

The present application is also a continuation-in-part of pending application Ser. No. 07/358,692 filed May 26, 1989, which in turn is a continuation-in-part of application Ser. No. 205,495 filed Jun. 6, 1988, abandoned, which in turn was a continuation of application Ser. No. 921,753 filed Oct. 22, 1986, abandoned; and a continuation-in-part of application Ser. No. 07/134,948, filed Dec. 18, 1987, now U.S. Pat. No. 4,863,745, which in turn was a continuation-in-part of application Ser. No. 06/921,754 filed Oct. 22, 1986, abandoned.

The present application is also a continuation-in-part of pending application Ser. No. 07/565,605 filed Aug. 9, 1990, which in turn was a continuation-in-part of: 1) application Ser. No. 07/383,291 filed Jul. 17, 1989, which was a continuation of application Ser. No. 07/205,495 filed Jun. 6, 1988, abandoned, which was a continuation of application Ser. No. 06/921,753 filed Oct. 22, 1986, abandoned; 2) application Ser. No. 07/311,125 filed Feb. 15, 1989; and 3) PCT applications designating the U.S. as follows: PCT/US88/04400 filed Dec. 9, 1988; PCT/US89/01269 filed Mar. 28, 1989; PCT/US89/03764 filed Aug. 30, 1989; PCT/US89/05296 filed Nov. 22, 1989; PCT/US90/02255 filed Apr. 25, 1990; and PCT/US90/04005 filed Jul. 17, 1990.

Each of the foregoing is hereby incorporated by references.

BACKGROUND OF THE INVENTION

The present invention relates to chewing gum, and more particularly to a gum ingredient which has been found to reduce bitterness and harshness in strongly mint-flavored chewing gums.

Gums that contain high levels of mint-flavor (high ratios of flavor to base) achieve high flavor impact upon chewing. While this high flavor impact is desired by many consumers, the high flavor level may result in undesirable flavor characteristics later in the chew. These may include bitterness (a true taste) or unpleasant trigeminal effects often described as harshness, sharpness, burning or bite. For simplicity, these trigeminal effects will be referred to as "harshness," keeping in mind that perceptions and descripters will vary from person to person, and that several slightly different phenomenon may be included within this term. These undesirable sensations effectively limit the level of mint-flavor that may be used in a chewing gum product which, in turn, limits the initial flavor impact.

It would be of benefit to be able to use high levels of mint-flavor, or high flavor/base ratios, in gum without the bitterness, harshness, sharpness, burning or bite generally accompanying such high flavor usage levels.

SUMMARY OF THE INVENTION

It has been surprisingly discovered that the use of a granulated ingredient containing zein (an alcohol soluble protein obtained from corn) and a cellulose derivative such as hydroxypropylmethylcellulose (HPMC) serves to moderate the negative flavor characteristics caused late in the chew by high levels of mint-flavor. The present invention thus includes methods of making chewing gum with high levels of mint-flavor and the unique granulated ingredient, as well as the gum composition using the unique ingredient and the ingredient itself.

BRIEF DESCRIPTION OF THE DRAWING

FIGS. 1-4 depict the results of a panel taste test for 12 minutes of gum chewing, comparing gum compositions that were very similar except for the inclusion of a unique granulated product of zein, HPMC and a small amount of sodium hydroxide.

FIG. 1 depicts the bitterness rating;
FIG. 2 depicts the sharpness/bite rating;
FIG. 3 depicts the harshness rating and
FIG. 4 depicts the mint-flavor rating.

Figure 1:
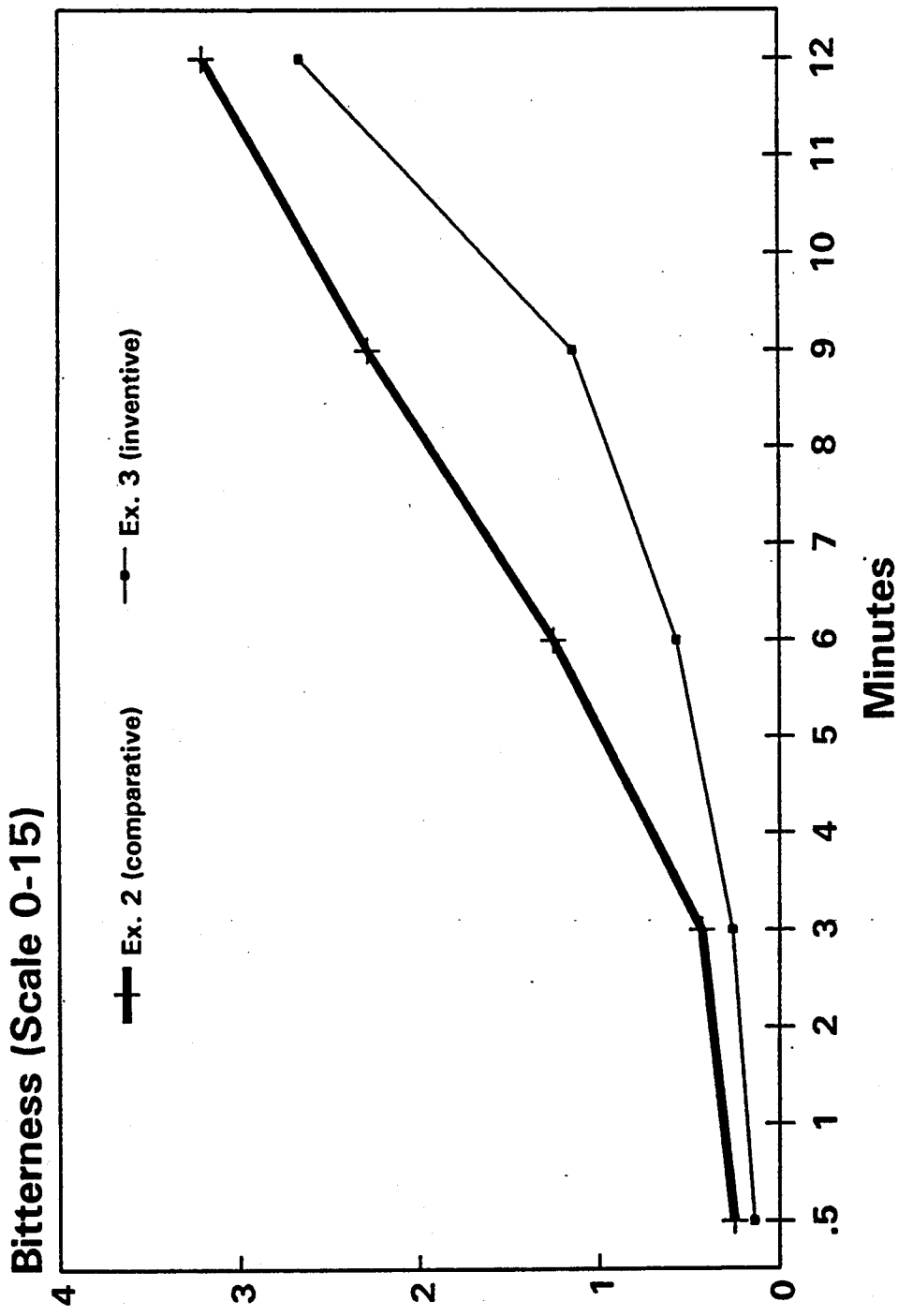

DETAILED DESCRIPTION OF THE DRAWINGS AND THE PREFERRED EMBODIMENTS OF THE INVENTION

Unless specified otherwise, all percents used herein and in the appended claims are weight percents. Also, the term "chewing gum" includes conventional chewing gum, bubble gum and the like.

Zein is a protein of the prolamine class derived from corn. Specifically, zein is obtained in powder form and is yellow, tasteless and is generally known to be insoluble in water (except at a very high pH) and soluble in alcohol. In the most preferred embodiment the zein is obtained from the Freeman Co.

The unique ingredient contains zein and a cellulose derivative at a ratio of between about 5:1 and about 1:5. Preferably the ratio of zein to cellulose derivative is between about 1:1 and about 1:4. Most preferably the unique ingredient will contain about 1 part zein to about 3 parts cellulose derivative. The manner of making the ingredient is not believed to be critical. However, the zein may preferably coat the cellulose derivative.

Zein has been known in the past to be used as a coating material. However, in these uses, the zein was typically dissolved in ethyl alcohol. Naturally, the use of ethyl alcohol requires the installation of additional equipment to reduce the danger from explosions, fire or toxic effects. While zein can be applied from an alcohol solution, the preferred embodiments of the invention avoid these problems by using zein in an aqueous solution. An aqueous solution of zein is made possible by virtue of the fact that the aqueous solution is maintained at a relatively high-pH, i.e. between about 11.5 and about 12.1. In this pH range, it has been found that the zein is significantly more soluble than in neutral water. Typically, when mixed with neutral water, zein powder will float on the top of the water without any appreciable dissolution, or even suspension of the zein within the water. Accordingly, it is not possible to coat particles with a solution of zein in neutral water.

In contrast, when mixed into water which has a pH of between about 11.5 and 12.1, it is possible to get significant solution and suspension of zein particles within the water. In particular, it has been found that an aqueous solution of zein can be formed which contains up to 25% by weight zein. At a level of 25%, the major portion of the zein is solvated, with only a minor portion being suspended within the solution.

The aqueous solution of zein is prepared by adding the desired amount of zein to a quantity of water along with an amount of base sufficient to create a pH between about 11.5 and about 12.1. Preferably, sodium hydroxide is added to the water in sufficient quantity to create a pH between 11.6 and 11.9. It is preferred to add the zein and base simultaneously in increments while stirring. A preferred method of preparing a high-pH zein solution is disclosed in U.S. patent application Ser. No. 07/311,125 filed Feb. 15, 1989, incorporated herein by reference. Alternatively, either the zein or the base can be added to the water before the other.

Besides sodium hydroxide, other food grade acceptable strong bases can be used, including potassium hydroxide. Depending on the base used, the solution will normally comprise about 0.1% to about 3% of the food grade base. The base used to make the solution will of course be present in small amounts in the zein-cellulose derivative. This, however, has been found to be acceptable, and perhaps even preferable.

Generally, the zein solution should contain between about 1% and about 25% by weight zein. Preferably, the zein solution should have a zein content of between about 10% and about 20% by weight. More preferably, the zein content will be between about 13% and about 18% by weight, most preferably about 16% percent by weight. As noted above, the zein content is higher than would be available without the high-pH level of the water.

A high-pH aqueous zein solution can be used to coat hydroxypropylmethylcellulose (HPMC) and other cellulose derivatives to make the unique ingredient of the present invention. In addition to HPMC, it is believed that hydroxymethylcellulose (HMC), hydroxypropylcellulose (HPC), ethylcellulose, methylcellulose, sodium hydroxymethylcellulose, carboxy methylcellulose and mixtures of all of the above are other cellulose derivatives suitable for making the granulated ingredient.

The coating techniques include those which use zein in a solution, such a spray drying, fluid bed coating, coacervation, granulation, agglomeration and combinations thereof. Any standard technique that gives partial or full encapsulation can be used. The encapsulation techniques that give partial encapsulation or full encapsulation can be used individually or in any combination, in a single step process or multi-step process.

The encapsulation techniques here described are standard coating techniques and generally get varying degrees of coating, from partial to full coating, depending on the amount of coating used in the process. Also, the coating composition may be susceptible to water permeation to various degrees. The amount of coating or encapsulation material also controls the length of time for its release from chewing gum. Preferably, when made from a high-pH, aqueous zein solution coating step, the unique ingredient comprises about 15% to about 35% zein, about 50% to about 85% cellulose derivative and about 0.1% to about 1.0% food grade base, and the product will preferably be dried to contain less than about 8% moisture, and preferably less than about 5% moisture.

After drying, the ingredient is preferably sized to be more easily mixed into the gum and not be noticeable thereafter. Particle sizes that will pass through a U.S. standard 60 mesh sieve are preferred.

Other methods may be used to produce the zein-cellulose derivative ingredient, such as using the cellulose derivative to coat the zein, or mixing the two ingredients in powdered form and agglomerating them together. The zein-cellulose derivative ingredient should be provided in a granulated form.

The zein-cellulose derivative ingredient may readily be incorporated into a chewing gum composition. Preferably the gum will contain about 0.02% to about 1% of the zein-cellulose derivative ingredient. The remainder of the chewing gum ingredients are non-critical to the present invention. That is, the zein-cellulose derivative ingredient can be incorporated into conventional chewing gum formulations in a conventional manner. Naturally, the preferred chewing gum formulation is a high mint-flavor content chewing gum. The unique ingredient may be used in a sugar or sugarless chewing gum. The zein-cellulose derivative ingredient may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomer, resins, fats and oils, waxes, softeners and inorganic fillers. Elastomers may include polyisobutylene, isobutyle-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and coca butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners (which may also serve as bulking agents), flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

The bulking agents generally comprise from about 5% to about 95% of the gum composition, preferably from about 10% to about 90%, and more preferably from about 20% to about 60%.

As mentioned above, the zein-cellulose derivative ingredient of the present invention may be used in sugar or sugarless gum formulations. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-stability needed, the coated HPMC of the present invention can be used in combination with uncoated high-potency sweeteners or with high-potency sweeteners coated with other materials and by other techniques.

A mint-flavoring agent will be present in the chewing gum in an amount within the range of from about 0.1% to about 10% of the gum, preferably from about 0.6% to about 3.0% and more preferably from about 1.1% to about 2.0% of the gum. The flavor/base ratio will generally be between about 1:40 and about 1:8, and preferably between 1:25 and about 1:15. The flavoring agents may comprise essential oils, synthetic flavors, or mixture thereof including, but not limited to peppermint oil, spearmint oil and corn mint oil. In addition to the mint-flavors, other flavors such as oils derived from plants and fruits such as citrus oils, fruit essences, clove oil, oil of wintergreen, anise and the like may be used. Artificial flavoring components are also contemplated for use in gums of the present invention. Those skilled in the art will recognize that natural and artificial flavoring agents may be combined in any sensorially acceptable blend. All such mint-containing flavors and flavor blends are contemplated by the present invention.

The level of flavor in gum which produces unacceptable harshness or bitterness is influenced by many factors. These include base level and type, flavor type, level and type of artificial sweeteners included in the gum and personal perception. As a general rule, spearmint oil will produce an unacceptable harshness/bitterness in the late chew when its level exceeds 4 to 7% of the gum base. Peppermint oil may be used at slightly higher levels before becoming objectionable. This is a rough guideline and gums with higher base contents will tolerate higher flavor levels relative to the base level. For example, a spearmint-flavored gum which contains 20% base and 0.9% flavor might have the same degree of harshness/bitterness as another containing 2.0% spearmint oil and 30% of the same base.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. The flavoring agent is typically added with the final portion of the bulking agent. The zein-cellulose derivative of the present invention may be added at any time during the mixing process.

The entire mixing procedure typically takes from five to fifteen minutes, but longer mixing times may sometimes be required. Those skilled in the art will recognize that many variations of the above described procedure may be followed.

The granulated ingredient shown to be effective in reducing bitterness and harshness may be formulated and prepared as in Example 1.

EXAMPLE 1: GRANULATED INGREDIENT

1. Eight pounds of hydroxypropylmethylcellulose (HPMC) (Dow E5 Premium) is dispersed into 32 pounds of distilled water and allowed to hydrate for at least 36 hours.

2. Twenty-two pounds of distilled water is weighed into a carboy and stirring is established with a magnetic stirrer. A 0.88 pound quantity of sodium hydroxide pellets is slowly added to the carboy and agitation is continued until all the pellets have dissolved.

3. Fifty-one pounds of distilled water are placed in a stainless steel tank and agitated with a Lightnin stirrer. A pH electrode is positioned in the water and a pipette is used to transfer the sodium hydroxide solution from Step 2 into the tank until the pH is between 9.0 and 10.0. At this time, 9.47 pounds of zein powder is dispersed in the water and the pH is raised to 11.8 through further additions of sodium hydroxide solution. A total of approximately 5 pounds of the sodium hydroxide solution is used. The zein powder is allowed to dissolve completely. A 7.28 pound quantity of the HPMC solution from Step 1 is then added in 3 increments with continued stirring. Each increment is allowed to thoroughly disperse before the next is added.

4. The solution from Step 3 is transferred to a planetary mixer which is then switched on. Twenty-seven pounds of HPMC powder (DOW E5 Premium) is slowly added to produce a heavy paste.

5. The wet ingredient from Step 4 is transferred to trays for drying in a forced air kiln at 170° F. for at least 24 hours. The dried product will have a final moisture of about 4% or less.

6. The dried product of Step 5 is cooled and then ground in a Fitzmill grinder with a 0.25 inch RH (round hole) screen. This product is then fed into a M2DH mill equipped with a 0.027 inch HB (Herring Bone) screen. The product is then sifted through a 60 mesh sieve. The material which passes through the sieve is the final product.

The final granulated ingredient of Example 1 has the following approximate composition: 23.72% zein, 71.72% HPMC, 0.56% sodium hydroxide and 4.00% water.

The granulated ingredient of Example 1 was used to prepare spearmint-flavored chewing gums having a high flavor impact. The gums were made using the following formulae.

|  | Example 2 (comparative) | Example 3 (inventive) |
|---|---|---|
| Sugar | 52.647 | 52.541 |
| Base | 23.910 | 23.910 |
| Dextrose Monohydrate | 13.410 | 13.410 |
| Corn syrup | 7.000 | 7.000 |
| Glycerin | 0.889 | 0.889 |
| Spearmint-flavor* | 1.250 | 1.250 |
| 10% Salt solution | 0.100 | 0.100 |
| Hydroxylated Lecithin | 0.050 | 0.050 |
| Encapsulated Glycyrrhizin** | 0.744 | 0.750 |
| Granulated ingredient of Ex. 1 | — | 0.100 |
|  | 100.000 | 100.000 |

*Contains 73.42% spearmint oil, 18.35% peppermint oil, 5.98% menthol, 2.25% artificial flavor blend.
**Encapsulated ammoniated glycyrrhizin ingredient, prepared according to the process disclosed in U.S. Pat. application Ser. No. 07/606,044, incorporated herein by reference. Differential in usage level was inadvertent and not considered significant.

Figure 2:
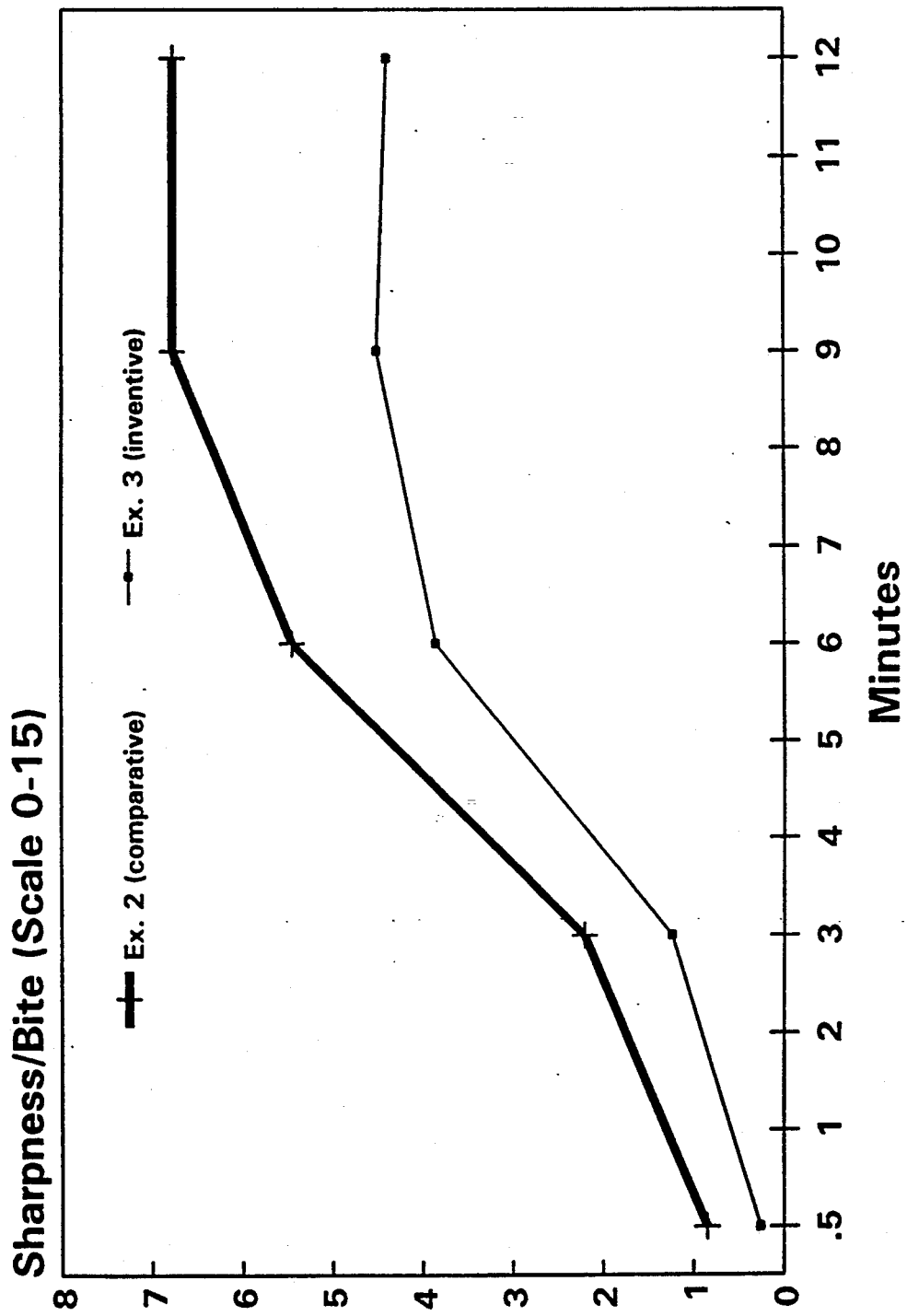

The two chewing gums of Examples 2 and 3 were sensory tested by a group of eight expert panelists. The panelists were not informed as to the nature of the products but were instructed to rate the samples at 0.5, 3, 6, 9 and 12 minutes of chewing. The panelists rated the samples for bitterness, sharpness/bite, harshness and mint-flavor by making marks on a line scale which were later translated into a 15-point number scale for analysis. The results of this test are presented graphically in FIGS. 1-4.

As can be seen in the graphs, the inventive composition (Example 3) is lower in bitterness, sharpness/bite and harshness but not significantly lower in mint-flavor.

The exact reason for the beneficial effect of this unique ingredient is unknown, but a number of theories exist:

1. The zein protein molecule, particularly in a high-pH environment, opens up and binds ionically or covalently with select flavor molecules. (For example, trace aldehydes and phenolic compounds.)
2. The HPMC and/or zein coats mucous membranes in the mouth, preventing the perception of harshness/bitterness. Similar hydrocolloid carbohydrates and proteins could potentially achieve the same end result.

Since the sample of the ingredient first tested also included sodium hydroxide, there were three additional theories as to why that sample unique ingredient had its beneficial effects:

3. The sodium hydroxide serves to solubilize certain flavor components which are then swallowed, preventing bitterness/harshness later on.
4. The sodium hydroxide interacts with receptors in the mouth to prevent the perception of bitterness/harshness. The zein/HPMC serves to control and delay the release of the sodium hydroxide.
5. The sodium hydroxide neutralizes acidic flavor components which would otherwise cause bitterness/harshness. Again, delayed release could be important.

However, preliminary results from additional tests suggest that the base is not always necessary.

Since the reason for the beneficial result may be attributed to any of a number of reasons, the unique ingredient of the present invention may not require the presence of all three of the components used in Example 1. In fact, it is currently believed that the zein and a cellulose derivative are the most significant ingredients. However, it may be that zein and a base, or a base and a cellulose derivative, may be combinable to provide the unique ingredient of the present invention. It is also possible that the zein and cellulose derivative, if added separately to the gum, would provide the beneficial result.

The unique ingredient of the present invention may also be formulated with one or more other ingredients, particularly high-potency, artificial sweeteners. The usage level of the ingredient will need to be higher than the 0.02% to 1% level listed above if the ingredient comprises other components. For example, if the ingredient is only 50% zein, cellulose derivative and base, the ingredient would need to be used at twice its normal level in gum. Examples 4-6 below provide a process for making such a combined zein-cellulose derivative ingredient and artificial sweetener. U.S. Pat. No. 4,863,745 to Zibell, which issued from U.S. application Ser. No. 07/134,948 filed Dec. 18, 1987 as a continuation-in-part of U.S. application Ser. No. 06/921,754 filed Oct. 22, 1986, both of which are hereby incorporated by reference, discloses other zein-coated high-potency sweetener compositions, repeated below as Examples 18 and 19.

EXAMPLE 4

Acesulfame K and sucralose in a 3:1 ratio are blended together as a powder and then agglomerated with water and HPMC. This blend is dried, ground and agglomerated further with a high-pH, aqueous 15% solution of zein to obtain a product containing 51% acesulfame K, 17% sucralose, 12% HPMC and 20% zein.

EXAMPLE 5

Alitame and sucralose in a 1:3 ratio are blended together as a powder and then agglomerated with water and HPMC. This blend is dried, ground and agglomerated further with a high-pH, aqueous 15% solution of zein to obtain a product containing 17% alitame, 51% sucralose, 12% HPMC and 20% zein.

EXAMPLE 6

Sodium cyclamate and sucralose in a 10:1 ratio are blended together as a powder and then agglomerated with water and HPMC. This blend is dried, ground and agglomerated further with a high-pH, aqueous 15% solution of zein to obtain a product containing 62% sodium cyclamate, 6% sucralose, 12% HPMC and 20% zein.

EXAMPLE 7

Glycyrrhizin and sodium cyclamate in a 1:1 ratio are blended together as a powder and then agglomerated with water and HPMC. This blend is dried, ground and agglomerated further with a high-pH, aqueous 15% solution of zein to obtain a product containing 34% sodium cyclamate, 34% glycyrrhizin, 12% HPMC and 20% zein.

EXAMPLE 8

Neohesperidin dihydrocalcone ("NeoDHC") and sodium cyclamate in a 1:5 ratio are blended together as a powder and then agglomerated with water and HPMC. This blend is dried, ground and agglomerated further with a high-pH, aqueous 15% solution of zein to obtain a product containing 55% sodium cyclamate, 11% NeoDHC, 14% HPMC and 20% zein.

EXAMPLE 9

NeoDHC is agglomerated with HPMC in a ratio of 85:15 NeoDHC/HPMC. After drying and grinding, the resulting powder is agglomerated with a 15% solids, high-pH, aqueous solution of zein to give a final product containing about 60% active NeoDHC, 10% HPMC and 30% zein.

EXAMPLE 10

Stevioside is agglomerated with HPMC in a ratio of 85:15 stevioside/HPMC. After drying and grinding, the resulting powder is agglomerated with a 15% solids, high-pH, aqueous solution of zein to give a final product containing about 60% active stevioside, 10% HPMC and 30% zein.

EXAMPLE 11

Alitame is agglomerated with HPMC in a ratio of 85:15 alitame/HPMC. After drying and grinding, the resulting powder is agglomerated with a 15% solids, high-pH, aqueous solution of zein to give a final product containing 60% active alitame, 10% HPMC and 30% zein.

EXAMPLE 12

Glycyrrhizin is agglomerated with HPMC in a ratio of 85:15 glycyrrhizin/HPMC. After drying and grinding, the resulting powder is agglomerated with a 15% solids, high-pH, aqueous solution of zein to give a final product containing about 60% active glycyrrhizin, 10% HPMC and 30% zein.

EXAMPLE 13

Sucralose is agglomerated with HPMC in a ratio of 85:15 sucralose/HPMC. After drying and grinding, the resulting powder is agglomerated with a 15% solids, high-pH, aqueous solution of zein to give a final product containing about 60% active sucralose, 10% HPMC and 30% zein.

EXAMPLE 14

Stevioside and sodium cyclamate in a 1:3 ratio are blended together as a powder and then agglomerated with water and HPMC. This blend is dried, ground and agglomerated further with a high-pH, aqueous 15% solution to zein to obtain a product containing 51% sodium cyclamate, 17% stevioside, 12% HPMC and 20% zein.

EXAMPLE 15

Acesulfame K is agglomerated with HPMC in a ratio if 85:15 acesulfame K/HPMC. After drying and grinding, the resulting powder is agglomerated with a 15% solids, high-pH, aqueous solution of zein to give a final product containing about 60% active acesulfame K, 10% HPMC and 30% zein.

EXAMPLE 16

Sodium cyclamate is agglomerated with HPMC in a ratio of 85:15 sodium cyclamate/HPMC. After drying and grinding, the resulting powder is agglomerated with a 15% solids, high-pH, aqueous solution of zein to give a final product containing about 60% active sodium cyclamate, 10% HPMC and 30% zein.

Examples 4 to 16 may be used to make chewing gum of either sugar or sugarless variety. Sample formulas are given in Tables 1 to 3 below. (The formulas are based on the use of aspartame, acesulfame K, sucralose, saccharin, cyclamates, glycyrrhizin and stevioside, and should be adjusted for other sweeteners to account for their level of sweetness.)

TABLE 1

| | Sugar | Sugar With Sorbitol | Sugarless With Water | Sugarless With Lycasin | Sugarless No Water |
|---|---|---|---|---|---|
| Gum Base | 19.2 | 19.2 | 25.5 | 25.5 | 25.5 |
| Sugar | 55.45 | 53.45 | — | — | — |
| Sorbitol | — | 2.0 | 53.7 | 49.4 | 52.2 |
| Mannitol | — | — | 8.0 | 8.0 | 12.0 |
| Corn Syrup | 13.1 | 13.1 | — | — | — |
| Lycasin/Sorbitol Liquid | — | — | 9.5(a) | 6.8(b) | — |
| Glycerin | 1.4 | 1.4 | 1.5 | 8.5 | 8.5 |
| Lecithin | — | — | 0.2 | 0.2 | 0.2 |
| Dextrose Monohydrate | 9.9 | 9.9 | — | — | — |
| Flavor | 0.9 | 0.9 | 1.5 | 1.5 | 1.5 |
| Level of Active Sweetener | 0.05 | 0.05 | 0.1 | 0.1 | 0.1 |

(a)liquid sorbitol (70% sorbitol, 30% water)
(b)hydrogenated starch hydrolysate syrup

TABLE 2

| | A | B | C | D | E | F | G |
|---|---|---|---|---|---|---|---|
| Gum Base | 19.2 | 19.2 | 19.2 | 19.2 | 19.2 | 19.2 | 19.2 |
| Sugar | 59.4 | 50.4 | 49.4 | 49.4 | 50.4 | 52.4 | 52.4 |
| Glycerin | 1.4 | 1.4 | 1.4 | 1.4 | 1.4 | 1.4 | 1.4 |
| Corn Syrup | 19.0 | 23.0 | 19.0 | 19.0 | 23.0 | 16.0 | 16.0 |
| Dextrose | — | — | 5.0 | — | — | — | — |
| Lactose | — | — | — | — | 5.0 | — | — |
| Fructose | — | — | 5.0 | — | — | — | — |
| Invert Sugar | — | — | — | 10.0 | — | — | — |
| Maltose | — | — | — | — | — | 10.0 | — |
| Palatinose | — | — | — | — | — | — | 10.0 |
| Corn Syrup Solids | — | 5.0 | — | — | — | — | — |
| Peppermint-flavor | 0.9 | 0.9 | 0.9 | 0.9 | 0.9 | 0.9 | 0.9 |
| Level of Active Sweetener | 0.1 | 0.1 | 0.1 | 0.1 | 0.1 | 0.1 | 0.1 |

TABLE 3

| | H | I | J | K | L | M | N | O | P |
|---|---|---|---|---|---|---|---|---|---|
| Base | 25.5 | 25.5 | 25.5 | 25.5 | 25.5 | 25.5 | 25.5 | 25.5 | 25.5 |
| Sorbitol | 53.9 | 46.9 | 41.9 | 41.9 | 41.9 | 41.9 | 36.9 | 37.9 | 46.9 |
| Sorbitol Liquid/Lycasin | 17.0 | 14.0 | 6.0 | — | 5.0 | — | — | 6.0(a) | 18.0(a) |
| Mannitol | — | 10.0 | 8.0 | 8.0 | 8.0 | 8.0 | 8.0 | 8.0 | 8.0 |
| Maltitol | — | — | — | 5.0 | — | 8.0 | 5.0 | — | — |
| Xylitol | — | — | 15.0 | 10.0 | — | — | 5.0 | 15.0 | — |
| Lactitol | — | — | — | — | 10.0 | — | — | — | — |
| Palatinit | — | — | — | — | — | 15.0 | 10.0 | — | — |
| Glycerin | 2.0 | 2.0 | 2.0 | 8.0 | 8.0 | 8.0 | 8.0 | 6.0 | — |
| Flavor | 1.5 | 1.5 | 1.5 | 1.5 | 1.5 | 1.5 | 1.5 | 1.5 | 1.5 |

TABLE 3-continued

| | (Wt. %) | | | | | | | | |
|---|---|---|---|---|---|---|---|---|---|
| | H | I | J | K | L | M | N | O | P |
| Level of Active Sweetener | 0.1 | 0.1 | 0.1 | 0.1 | 0.1 | 0.1 | 0.1 | 0.1 | 0.1 |

(a)Lycasin brand HSH syrup, all others use sorbitol liquid

EXAMPLE 17

First, 7711g of unmilled APM from the G.D. Searle Company was placed in the 40 qt. bowl of a Hobart mixer. 1361 g of HPMC (Methocel E4M from the Dow Chemical Company) was also added to the bowl. These two powders were dry blended at the low speed setting on the mixer for approximately 15 minutes. A total of approximately 4880 ml of water was added to this mixture. This was accomplished by adding between 200 and 1000 ml of water every 3 to 5 minutes with the mixer running. The damp mixture that resulted was dustless and coalesced when squeezed. The damp mixture was mixed for about 5 minutes after the last water addition to insure complete interdispersion. The damp mixture was transferred to stainless steel trays and spread to a depth of approximately 2 cm. At this point, the material was approximately 34.6 wt. % water, 9.8 wt. % HPMC and 55.6 wt. % APM. The trays were placed in an oven and heated to 170° for 12 to 14 hours. After drying the mixture was ground in a Fitzmill at high speed while using a 0.05 inch screen. The water content of the final product was between 2 and 3 wt. %.

Sieve analysis of the product showed the following particle size distribution:

| larger than 0.0331 inches | 3% |
|---|---|
| 0.0331 to 0.0165 inches | 37% |
| 0.0165 to 0.0098 inches | 21% |
| 0.0098 to 0.0059 inches | 15% |
| 0.0059 to 0.0029 inches | 14% |
| smaller than 0.0029 inches | 10% |

The grinding process was repeated with a 0.027 inch screen. Sieve analysis of the product gave the following results:

| 20 | larger than 0.0331 inches | 0% by weight |
|---|---|---|
| 40 | .0331 to 0.0165 inches | 2% by weight |
| 60 | .0165 to 0.0098 inches | 25% by weight |
| 700 | .0098 to 0.0059 inches | 25% by weight |
| 200 | .0059 to 0.0029 inches | 21% by weight |
| pan | smaller than 0.0029 inches | 27% by weight |

An aqueous solution of zein was prepared from 14.4% dry zein, 77.6% water and about 8% of a 1 M sodium hydroxide solution (adjusted to give a pH of 11.8). 6030g of the APM-HPMC ground product was added to the 40 qt Hobart Mixer and 2970g of the zein solution was added slowly with the mixer running to give a mixture of damp cohesive particles.

The damp mixture was spread onto drying trays and dried for 12-16 hours at 170° F. The material was then ground using a micropul grinder which is a screw type pulverizer which produces exceedingly fine particle sizes. Sieve analysis showed a particle size distribution as follows:

| larger than 0.0098 inches | 2% |
|---|---|
| 0.0098 to 0.0059 inches | 6% |
| 0.0059 to 0.0029 inches | 27% |
| smaller than 0.0029 inches | 65% |

The material of Example 17 was made into gum with the following composition:

| INGREDIENT | WT % |
|---|---|
| gum base | 27.0 |
| sorbitol | 40.2 |
| mannitol | 12.0 |
| glycerin | 8.1 |
| 70% sorbitol solution | 1.0 |
| peppermint oil | 1.3 |
| APM ingredient | 0.4 |

EXAMPLE 18

7711 g of unmilled aspartame from the G.D. Searle Company was placed in the 40 qt. bowl of a Hobart mixer. 1361 g of Methocel E4M from the Dow Chemical Co. was also added to the bowl. These two powders were dry blended at the low speed setting on the mixer for approximately 15 minutes. A total of approximately 4880 ml of water was added to this mix. This was accomplished by adding between 200 to 1000 ml of water every 3 to 5 minutes with the mixer running. The damp mix that resulted was dustless and coalesced when squeezed. The damp mix was mixed for about 5 minutes after the last water addition to insure complete interdispersion. The damp mix was transferred to stainless steel trays and spread to a depth of approximately 2 cm. At this point, the material was approximately 34.6 weight percent water, 9.8 weight percent HPMC and 55.6 weight percent aspartame. The trays were placed in an oven and heated to 170° for 12 to 14 hours. After drying the mix was ground in a Fitzmill at high speed which using a 0.04 inch screen. The water content of this intermediate methocel coated aspartame was between 2 and 3 weight percent.

A 6,804 g quantity of the Methocel product prepared above was then treated with a zein solution prepared by mixing 6,216 g of water, 1273 g of zein, and 175 ml of a 4M sodium hydroxide solution. The methocel coated aspartame product was placed in a 40 quart bowl of a Hobart mixer. The mixer was activated on the low speed and 3551 g of the zein solution was added in increments between 300 and 500 grams every 3 to 5 minutes with the mixer running. The damp mix that resulted was dustless and coalesced when squeezed. The damp mix was mixed for about 5 minutes after the last zein solution addition to insure complete interdispersion. The damp mix was transferred to stainless steel trays and spread to a depth of approximately 1 to 2 cm. At this point, the material was about 29 weight percent water, 66 weight percent Methocel coated aspartame, and about 5 weight percent zein.

The loaded trays were placed in a conventional oven and heated to about 170° F. for 18 to 20 hours. After drying, the mix was ground in a Fitzmill at high speed using a 0.04 inch screen. The water content of the final product was 4.4 weight percent. The calculated aspartame content was about 77.8 weight percent, while the value from chemical analysis was about 78.3 weight percent.

EXAMPLE 19

Example 19 was carried out the same as Example 18 with the exception that instead of an aqueous solution of zein, an ethanol solution with a different zein content was used. In particular, the ethanol/zein solution contained about 36.5 weight percent zein. Methocel coated aspartame was prepared by the same process described in Example 18. An 11,213 g quantity of the methocel coated aspartame product was then treated with a zein solution prepared by mixing 3,140 g of zein and 5,460 g of food grade ethanol. The Methocel coated aspartame was placed in the bowl of a 40 quart Hobart mixer. The mixer was activated on the low speed, and 8,600 g of the ethanol/zein solution was added in increments of between 300 and 500 ml every 3 to 5 minutes with the mixer running. The damp mix that resulted was dustless and coalesced when squeezed. The damp mix was mixed for about 5 minutes after the last zein solution to insure complete interdispersion.

The damp mix was transferred to stainless steel trays and spread to a depth of approximately 1 to 2 cm. At this point, the material was about 58 weight percent Methocel coated aspartame, 15 weight percent zein, and about 27 weight percent ethanol. The loaded trays were placed in a conventional oven and placed heated to about 160° F. for about 18 to 20 hours, with the exhaust being vented to the outside.

After drying, the mix was ground in a Fritzmill at high speed using a 0.04" screen. The water content of the final product was about 2.5 weight percent. The calculated aspartame content was about 65.4 weight percent, while the value obtained from chemical analysis was about 65.9 weight percent aspartame.

It should be understood that the preferred embodiment described in detail herein is illustrative of various aspects of the invention, and that various modifications and changes to the presently preferred embodiment may be made. Therefore, the following claims, including all equivalents, define the scope of the invention.

We claim:

1. A method of producing high-impact mint-flavor chewing gum comprising the steps of:
   a) preparing an ingredient comprising zein and a cellulose derivative and
   b) mixing the zein-cellulose derivative ingredient in a chewing gum formulation comprising about 5% to about 95% gum base, about 5% to about 95% bulking agent and about 0.1% to about 10% of a mint-flavoring agent.

2. The method of claim 1 wherein the cellulose derivative is selected from the group consisting of hydroxypropylmethylcellulose (HPMC), hydroxymethylcellulose (HMC), hydroxypropylcellulose (HPC), ethylcellulose, methylcellulose, sodium hydroxymethylcellulose, carboxy methylcellulose and combinations thereof.

3. The process of claim 1 wherein a food grade base and the zein are first mixed together in an aqueous solution which is then used to coat the cellulose derivative.

4. The method of claim 3 wherein the coating step is select from the group consisting of spray drying, fluid bed coating, coacervation, granulation, agglomeration and combinations thereof.

5. The method of claim 3 wherein the solution contains about 0.1% to about 3% sodium hydroxide.

6. The method of claim 3 wherein the solution comprises about 10% to about 20% zein.

7. The method of claim 3 wherein one portion of the cellulose derivative is first hydrated and mixed into the solution and the mixture is then mixed with a second portion of the cellulose derivative in powder form to form a heavy paste which is then dried and ground to pass through a U.S. standard 60 mesh sieve.

8. The method of claim 1 wherein the zeincellulose derivative ingredient is added to the gum composition at a level of about 0.02% to about 1% of the gum composition, based on zein and cellulose derivative content of the ingredient.

9. A high-impact mint-flavor chewing gum composition comprising:
   a) about 5% to about 95% gum base,
   b) about 5% to about 95% bulking agent,
   c) about 0.1% to about 10% mint-flavor and
   d) an effective amount of an ingredient comprising zein and a cellulose derivative to reduce bitterness and harshness during chewing of the gum.

10. The chewing gum composition of claim 9 wherein the bitterness reducing ingredient comprises about 0.02% to about 1% of the gum composition, based on the zein and cellulose derivative content of the ingredient.

11. The chewing gum composition of claim 9 wherein the cellulose derivative is selected from the group consisting of hydroxypropylmethylcellulose (HPMC), hydroxymethylcellulose (HMC), hydroxypropylcellulose (HPC), ethylcellulose, methylcellulose, sodium hydroxymethylcellulose, carboxy methylcellulose and mixtures thereof.

12. The chewing gum composition of claim 9 wherein the zein-cellulose ingredient further comprised a food grade base.

13. The chewing gum composition of claim 9 wherein the zein-cellulose derivative ingredient comprises zein and the cellulose derivative at a ratio of between about 5:1 and about 1:5.

14. The chewing gum composition of claim 9 wherein the zein-cellulose derivative ingredient comprises zein, hydroxypropylmethylcellulose and sodium hydroxide.

15. An ingredient for reducing bitterness and harshness in high-impact mint-flavor gums comprising:
   a) zein and
   b) a cellulose derivative selected from the group consisting of hydroxypropylmethylcellulose (HPMC), hydroxymethylcellulose (HMC), hydroxypropylcellulose (HPC), ethylcellulose, methylcellulose, sodium hydroxymethylcellulose, carboxy methylcellulose and mixtures thereof; the ratio of the zein and cellulose derivative being between about 5:1 and about 1:5.

16. The chewing gum ingredient of claim 15 wherein the ratio of zein to cellulose derivative is between about 1:1 and about 1:4.

17. The chewing gum ingredient of claim 15 wherein the ingredient further comprises about 0.1% to about 10% of a food grade base.

18. The chewing gum ingredient of claim 15 wherein the ingredient contains less than about 8% moisture.

19. The chewing gum ingredient of claim 15 wherein the ingredient is sized to pass through a U.S. standard 60 mesh sieve.

20. The chewing gum ingredient of claim 15 wherein the zein coats the cellulose derivative.

* * * * *

UNITED STATES PATENT AND TRADEMARK OFFICE
CERTIFICATE OF CORRECTION

PATENT NO. : 5,192,563
DATED      : March 9, 1993
INVENTOR(S): Mansukh M. Patel et al.          Page 1 of 3

It is certified that error appears in the above-indentified patent and that said Letters Patent is hereby corrected as shown below:

ON THE TITLE PAGE

In column 1, under "Related U.S. Application Data", please make the following corrections:

Line 1, after "part" insert --of Ser. No. PCT/US90/02255, Apr. 25, 1990; and a continuation-in-part of Ser. No. PCT/US90/04005, July 17, 1990; and a continuation-in-part of Ser. No. PCT/US90/06038, Oct. 22, 1990; and a continuation-in-part--;

Line 2, after "1989," delete "and a continuation-in-part of Ser. No. 134,948, Dec. 18, 1987, Pat. No. 4,863,745,";

Line 10, after "1989," insert --said Ser. No. 565,605, is a continuation-in-part of Ser. No. PCT/US88/04400, Dec. 9, 1988, said Ser. No. 565,605, is a continuation-in-part of Ser. No. PCT/US89/01269, Mar. 28, 1989, said Ser. No. 565,605, is a continuation-in-part of Ser. No. PCT/US89/03764, Aug. 30, 1989, said Ser. No. 565,605, is a continuation-in-part of Ser. No. PCT/US89/05296, Nov. 22, 1989, said Ser. No. 565,605, is a continuation-in-part of Ser. No. PCT/US90/02255, Apr. 25, 1990, said Ser. No. 565,605, is a continuation-in-part of Ser. No. PCT/US90/04005, July 17, 1990,--; and Line 13, delete "Ser. No. 134,948,", and substitute --Ser. No. 358,692 is a continuation-in-part of Ser. No. 134,948, Dec. 18, 1987, Pat. No. 4,863,745, which--.

UNITED STATES PATENT AND TRADEMARK OFFICE
CERTIFICATE OF CORRECTION

PATENT NO. : 5,192,563
DATED : March 9, 1993
INVENTOR(S) : Mansukh M. Patel et al.    Page 2 of 3

It is certified that error appears in the above-indentified patent and that said Letters Patent is hereby corrected as shown below:

In column 3, line 41, delete the second occurrence of "a" and substitute --as--.

In column 6, line 34, delete "Lightnin" and substitute --Lightning--.

In column 6, line 49, delete "DOW" and substitute --Dow--.

In column 8, line 15, delete "4-6" and substitute --4-16--.

In column 9, line 2 of Example 15, delete "if" and substitute --of--.

In column 11, line 56, delete "Mixer" and substitute --mixer--.

In column 12, line 44, add a comma (",") after "drying".

In column 12, line 45, after "Fitzmill" insert --grinder--.

In column 12, line 45, delete "which" and substitute --while--.

In column 12, line 52, delete "methocel" and substitute --Methocel--.

UNITED STATES PATENT AND TRADEMARK OFFICE
CERTIFICATE OF CORRECTION

PATENT NO. : 5,192,563
DATED : March 9, 1993
INVENTOR(S) : Mansukh M. Patel et al.

It is certified that error appears in the above-indentified patent and that said Letters Patent is hereby corrected as shown below:

In column 13, line 14, delete "methocel" and substitute --Methocel--.

In column 13, line 30, delete the second occurrence of "placed".

Column 14,

In claim 8, line 1, delete "zeincellulose" and substitute --zein-cellulose--,

Signed and Sealed this

Third Day of January, 1995

BRUCE LEHMAN

*Attest:*

*Attesting Officer*      *Commissioner of Patents and Trademarks*